(12) United States Patent
Robert et al.

(10) Patent No.: US 6,344,524 B1
(45) Date of Patent: Feb. 5, 2002

(54) PROCESS FOR THE PREPARATION OF POLYMERS COMPRISING AT LEAST ONE DOUBLE BOND AND HAVING FUNCTIONAL GROUPS CONTAINING A CARBONYL RADICAL ALONG THEIR CHAIN

(75) Inventors: Pierre Robert, Perignat les Sarlieve; Philippe Laubry, Marsat, both of (FR)

(73) Assignee: Michelin Recherche et Technique, S.A., Granges-Paccot (CH)

( * ) Notice: Subject to any disclaimer, the term of this patent is extended or adjusted under 35 U.S.C. 154(b) by 0 days.

(21) Appl. No.: 09/564,917

(22) Filed: May 4, 2000

(30) Foreign Application Priority Data

May 5, 1999 (FR) .............................. 99 05746

(51) Int. Cl.$^7$ .................................. C08F 8/00
(52) U.S. Cl. ................. 525/370; 525/332.8; 525/332.9; 525/383.1; 525/383.2; 525/375; 525/377; 525/383; 525/385
(58) Field of Search ................. 525/370, 375, 525/377, 383, 385

(56) References Cited

U.S. PATENT DOCUMENTS 3,781,260 A 12/1973 Halasa

FOREIGN PATENT DOCUMENTS

EP 0796869 A 9/1997

OTHER PUBLICATIONS

Kornilova T. A., et al.: "Synthesis of Polyfunctional Hydroxyl Containing Polyisoprene by Means of the Metallation Method," Polymer Science, U.S., Interperiodica, Birmingham, A1., vol. 35, No. 4, p. 549–551 XP000364825 ISSN: 0965–545X.

Primary Examiner—Bernard Lipman
(74) Attorney, Agent, or Firm—Baker Botts L.L.P.

(57) ABSTRACT

The present invention relates to a process for preparing functionalized polymers having at least one double bond and functional groups containing a carbonyl radical along their chains. The process involves (a) subjecting a starting polymer comprising at least one double bond, in an inert hydrocarbon solvent, to a hydroalumination or carboalumination reaction along its chain by adding an agent derived from aluminum to the starting polymer, (b) adding to the product obtained in (a) at least one electrophilic agent that reacts with said agent derived from aluminum and (c) stopping the functionalization reaction of (b) and recovering the functionalized polymer.

21 Claims, No Drawings

PROCESS FOR THE PREPARATION OF POLYMERS COMPRISING AT LEAST ONE DOUBLE BOND AND HAVING FUNCTIONAL GROUPS CONTAINING A CARBONYL RADICAL ALONG THEIR CHAIN

BACKGROUND OF INVENTION

The present invention relates to a process for the preparation of functionalized polymers which comprise at least one double bond, have functional groups containing a carbonyl radical along their chain and can be used in tires.

Since fuel saving and the need to protect the environment have become priorities, it has been desirable to produce mixtures of dienic polymers possessing the lowest possible hysteresis, which enables such polymers to be used in the form of semifinished products that form part of the composition of tires, such as underlayers, rubbers for bonding between different kinds of rubber, calendering rubbers for metal or textile reinforcements, and sidewall rubbers or treads. These polymers impart improved properties to tires, especially a reduced running resistance and an improved wear resistance.

It is known that the interactions between the polymers and the reinforcing fillers, based on silica or carbon black in the majority of cases, which are used in these tires have a significant influence on the above-mentioned properties of these tires.

To optimize these interactions, attempts have been made to modify the nature of the dienic polymers after polymerization, especially through the use of agents for functionalizing these polymers along their chain or at the end of the chain.

Several processes have been used heretofore for functionalizing an unsaturated polymer along its chain.

For example, the polymer may be functionalized by hydrosilylation, which consists essentially in reacting a solution of unsaturated polymer with a hydrogenated silicon derivative. Alternatively, the polymer may be functionalized by the grafting of azocarboxylate derivatives or by metallation using butyllithium.

For a detailed description of these processes, reference may be made to the following article: D. N. Schulz, K. N. Turner and M. A. Golub, Rubber Chemistry and Technology, 1982, vol. 55, pp. 809–859, incorporated herein by reference.

However, major disadvantage of these processes of functionalization along the chain is the relatively high cost they entail in order to obtain functionalized polymers which do not exhibit a change in macrostructure when compared to the starting polymers.

The object of the present invention is to overcome this disadvantage.

SUMMARY

The present invention provides a process for the preparation of functionalized polymers comprising at least one double bond and having functional groups containing a carbonyl radical along their chain which involves:

subjecting a starting polymer comprising at least one double bond, in an inert hydrocarbon solvent, to a hydroalumination or carboalumination reaction along its chain by adding to said starting polymer an agent derived from aluminum, adding to the product of this reaction at least one electrophilic agent that reacts with said agent derived from aluminum, and subsequently stopping the functionalization reaction of the second step and recovering the polymer functionalized along its chain.

DETAILED DESCRIPTION OF THE INVENTION

The starting polymer can be natural or synthetic and it may or may not already be functionalized. It can be a homopolymer or a copolymer, the term "copolymer" covering polymers which are each obtained from two or more than two types of monomers, for example terpolymers.

Isoprene, butadiene, isobutylene and vinylaromatic compounds, which may or may not be substituted, are examples of monomers which can be used to obtain this starting polymer.

Polybutadiene or polyisoprene, for example, are among the starting homopolymers which can be used.

Starting copolymers which can be used, include, inter alia, styrene/butadiene copolymers obtained by anionic or emulsion polymerization, isoprene/butadiene copolymers, styrene/butadiene/isoprene terpolymers or terpolymers of ethylene, propylene and a diene.

The starting polymers used are advantageously dienic elastomers in order to obtain elastomers functionalized along the chain.

To carry out the hydroalumination or carboalumination reactions involved in the first step of the process, which amount to the addition of an Al—H or Al—C bond, respectively, onto a double bond of said starting polymer according to the equations:

$$\text{Al—H} + \text{C}=\text{C} \rightarrow \text{H—C—C—Al} \tag{Eq. 1}$$

or

$$\text{Al—C} + \text{C}=\text{C} \rightarrow \text{C—C—C—Al} \tag{Eq. 2}$$

an alkyl-aluminum compound or an aluminate can be used in particular as said agent derived from aluminum.

Preferably diisobutylaluminum hydride (hereafter "DiBAH") is used as the agent derived from aluminum.

This first step is performed in an inert hydrocarbon solvent in such a way that the number of moles of agent derived from aluminum per 1000 g of starting polymer is between 0.05 mole and 5 moles, preferably between 0.05 mole and 0.5 mole.

Toluene, xylene, heptane or cyclohexane are preferred inert hydrocarbon solvents.

The first step is preferably carried out at a temperature of between 20° C. and 100° C., more preferably between 50° C. and 70° C.

In order to carry out the second step of the process according to the invention, an electrophilic agent containing a heteroatom, such as nitrogen and/or oxygen, is preferably used. Electrophilic agents which can be used include anhydrides, especially carbon dioxide, isocyanates or carbonyl derivatives.

In order to obtain a polymer with carboxylic acid groups along the chain, it is preferred that an anhydride, preferably carbon dioxide, is used as the electrophilic agent. It is also possible to use a cyclic anhydride such as succinic anhydride.

In order to obtain polymers with amide groups along the chain, it is preferred that an isocyanate, such as phenyl isocyanate, be used.

In order to obtain polymers with carboxylic acid or amide groups along the chain, the second step is advantageously carried out in such a way that the molar ratio of the electrophilic agent (in moles) to the agent derived from aluminum (in moles) is equal to or greater than 3.

To specifically obtain polymers functionalized with amide groups using phenyl isocyanate, said molar ratio is approximately equal to 4.

The second step is preferably carried out at a temperature of between 20° C. and 100° C., more preferably between 50° C. and 70° C.

The functionalization reaction of the second step is stopped, preferably by adding a metal complexing agent, which also has the effect of fluidizing the reaction medium, i.e. reducing viscosity. The complexing agent is preferably a metal chelate capable of releasing at least one proton in the complexation reaction.

Acetylacetone is preferably used as the chelating agent. Alternatively, benzoylacetone or 8-hydroxyquinoline may be used.

The molar ratio of the complexing agent (in moles) to the agent derived from aluminum (in moles) is then equal to or greater than 3.

In the case of functionalization with carboxylic acid or amide groups using carbon dioxide or phenyl isocyanate, respectively, as the electrophilic agent, a strong protonic acid, e.g. hydrochloric acid, is added to the reaction medium, following the addition of said metal complexing agent, in order to completely stop the functionalization reaction.

The molar ratio of the strong protonic acid (in moles) to the agent derived from aluminum (in moles) is then equal to or greater than 3.

The advantages of the present invention, can be more understood more clearly from the following non-limiting Examples which are provided for illustration and should not be construed as limiting the invention.

In these Examples the number-average molecular weights (Mn) of the starting polymers and the corresponding functionalized polymers were precisely determined by osmometry.

Also, the size exclusion chromatography (SEC) technique was used to determine the molecular weight distributions of samples of these polymers. Using standard products whose characteristics are described in Example 1 of European patent document EP-A-692 493, this technique made it possible to evaluate, for a sample, a number-average molecular weight (Mn) which has a relative value, as distinct from that determined by osmometry, and a weight-average molecular weight (Mw). The polydispersity index (Ip) of this sample was deduced therefrom (Ip=Mw/Mn).

In the SEC technique, the macromolecules are physically separated, using columns packed with a porous stationary phase, according to their respective sizes in the swollen state. Prior to this separation, the polymer sample is solubilized at a concentration of about 1 g/l in tetrahydrofuran.

The above-mentioned separation is carried out using a model "150C" chromatograph marketed under the name "WATERS". The eluting solvent is tetrahydrofuran, the flow rate is 1 ml/min, the temperature of the system is 35° C. and the analysis time is 30 min. A set of two "WATERS" columns of the "STYRAGEL HT6E" type is used.

The solubilized of polymer sample is injected in a volume of 100 μl. The detector is a "WATERS" model "R401" differential refractometer. Also, a software with the trade name "WATERS MILLENIUM" is used to process the chromatographic data.

EXAMPLE 1

Preparation of a Stereospecific Cis-1,4-polybutadiene Functionalized with Carboxylic Acid Groups by Hydroalumination with DiBAH and by the Electrophilic Addition of Carbon Dioxide This Example was carried out using a deoxygenated solution of a starting polybutadiene with a number-average molecular weight Mn of 190,000 g/mole, determined by osmometry, and with a polydispersity index Ip of 2.31, determined by the SEC technique.

The percentages of cis-1,4 and 1,2 linkages in this starting polybutadiene were 92% and 4%, respectively.

Furthermore, this starting solution contained 0.2 phr of the antioxidant N-1,3-dimethylbutyl)-N'-phenyl-p-phenylenediamine.

Following techniques known to those skilled in the art, and under the conditions set forth in Table I below, the necessary amount of a molar toluene solution of DiBAH (the fraction of polymer solution in the toluene was 7% by weight) was introduced at room temperature into a 10-liter reactor containing 7 liters of said deoxygenated solution.

The reaction medium was homogenized sufficiently by stirring for 10 minutes. Stirring was then stopped and the hydroalumination was carried out as a static process at 65° C. for 64 hours.

Functionalization was then carried out in the same reactor at 65° C. for 6 hours by the application of a carbon dioxide pressure of 6 bar.

The reaction was then stopped, initially with acetylacetone added to achieve a molar ratio of acetylacetone/aluminum of 12, and then with hydrochloric acid added to achieve a molar ratio of hydrochloric acid/aluminum of 4.5.

The elastomer solution obtained was then treated with 0.5 phr of the antioxidant 2,2'-methylenebis(4-methyl-6-t-butylphenol) and subsequently stripped in an acid medium (pH=2), preferably with steam. The elastomer treated in this way was then drained on a cylinder machine at 100° C. and dried under vacuum at 60° C. (inert nitrogen atmosphere) for 18 hours.

This was followed by a specific preparation of the elastomer for characterization by analysis which involved treating the elastomer by dissolving it in toluene three times in succession, followed each time by coagulating the elastomer in an acetone/water mixture acidified to pH 2 with hydrochloric acid in order to remove any traces of acid compounds (particularly stopper, antioxidant, catalyst residues, and by-products, such as isovaleric acid). The elastomer treated in this way was then dried in an oven at 50° C. under vacuum and under a nitrogen atmosphere.

The COOH groups were then assayed by acidimetry to calculate, on the one hand, the proportion of these COOH groups per kg of polymer, and on the other hand, the number of units per chain based on an Mn (determined by osmometry) of 190,000 g/mol.

Acidimetry was performed by dissolving a sample of the elastomer prepared in this way in a toluene/orthodichlorobenzene mixture. The COOH groups were neutralized, in the presence of pyridine, with a solution of tetrabutylammonium hydroxide in isopropanol. The equivalence point was detected by potentiometry.

The results obtained are shown in Table I, which refers to said starting polybutadiene ("PB") and the corresponding functionalized polybutadiene ("PB fct").

TABLE I

| | Hydro-alumination: mol DiBAH/kg PB | Mooney viscosity ML (1 + 4) | Inherent viscosity (dl/g) | Mn (measured by SEC) g/mol | Ip (measured by SEC) | Prop. of COOH groups meq/kg | Number of units per chain |
|---|---|---|---|---|---|---|---|
| Starting PB | | 49 | 2.48 | 118,000 | 2.31 | | |
| PB fct | 0.7 | 60 | 2.11 | 116,000 | 2.36 | 11 | 21 |

EXAMPLE 2

Preparation of Several Styrene/butadiene Copolymers Functionalized with Carboxylic Acid or Amide Groups by Hydroalumination with DiBAH and by the Electrophilic Addition of Carbon Dioxide or Phenyl Isocyanate In this Example six functionalization experiments were carried out using, in each case, the same deoxygenated solution of a starting styrene/butadiene copolymer having a number-average molecular weight Mn, of 180,000 g/mol, determined by osmometry, and a polydispersity index Ip of 1.09, determined by the SEC technique.

The percentages of styrene, cis-1,4 linkages, trans-1,4 linkages and 1,2 linkages in the starting copolymer were 25%, 28%, 32% and 40%, respectively.

The starting solution also contained 0.2 phr of the antioxidant N-1,3-dimethylbutyl-N'-phenyl-p-phenylenediamine and 0.2 phr of the antioxidant 2,2'-methylenebis(4-methyl-6-t-butylphenol).

Each of the first five experiments was carried out by the process described in Example 1, i.e. for functionalization with carboxylic acid groups using carbon dioxide as the electrophilic agent. The molar ratio of DiBAH/kg polymer was simply varied from experiment to experiment, the only differences compared with the above-mentioned process being as follows:

The fraction of polymer solution in the toluene was 10% instead of 7% by weight.

The reaction was stopped with hydrochloric acid in a molar ratio of hydrochloric acid/aluminum of 7.5 instead of 4.5.

The elastomer obtained was then treated with 0.3 phr of the antioxidant 2,2'-methylenebis(4-methyl-6-t-butylphenol) instead of 0.5 phr, prior to the stripping in an acid medium.

The elastomer was then redissolved in toluene with concentrated aqueous hydrochloric acid in such a way that the molar ratio of hydrochloric acid/aluminum was equal to 5.

A second stripping in an acid medium was then carried out to allow total removal of the residual isovaleric acid, which is a by-product of carboxylation of the isobutyl radicals contained in the DiBAH.

The proportion of carboxylic acid groups (in meq/kg polymer) and the number of corresponding functional units per copolymer chain (where Mn=180,000 g/mol, determined by osmometry) were calculated, with each of these two calculations being performed by two different methods:

The first method involved assaying the carboxylic acid groups by acidimetry as described in Example 1.

The second method involved in assaying by $^1$H NMR after esterification with excess diazomethane, a reagent known to react with carboxylic acid groups.

More precisely, this second method uses diazomethane to obtain methyl ester groups from the COOH groups which have been fixed to the elastomer, providing indirect and quantitative access to the proportion of COOH groups by $^1$H NMR.

The diazomethane was prepared beforehand by reacting an alcoholic potassium hydroxide solution with N-methyl-N-nitrosoparatoluenesulfonamide in the presence of diethyl ether at the temperature of melting ice. The ether phase containing the reagent was then recovered by simple distillation.

The esterification reaction was then carried out in the following manner.

A sample of the elastomer, washed and dried in the manner previously described in the context of the specific preparation of the elastomer for analysis, was solubilized in toluene. The ether solution containing the diazomethane was then added in such a way as to give an excess of reagent relative to the COOH groups. The polymer treated in this way was then coagulated in methanol, after which it was redissolved twice in toluene followed each time by coagulation in methanol. The polymer was then dried in a desiccator at room temperature and under a high vacuum produced by means of a vane pump.

A $^1$H NMR analysis was then performed in the following manner.

A sample of the polymer esterified in this way was solubilized in carbon disulfide. The $^1$H NMR signal was analyzed using a spectrometer marketed under the name BRUKER AC200. The signal characteristic of the three methyl protons of COOCH$_3$ provides quantitative access to the initial proportion of COOH groups in the functional polymer.

The sixth experiment was carried out by the same process as that which has been described for the first five experiments. The only difference was that the electrophilic agent used for the functionalization was phenyl isocyanate, instead of carbon dioxide, in order to functionalize the polymer with amide groups (the latter was still carried out at 65° C. for 6 hours).

Furthermore, the molar ratio of phenyl isocyanate (in moles) to DiBAH (in moles) was equal to 4.

The proportion of amide groups (in meq/kg polymer) and the number of corresponding functional units per copolymer chain (where Mn=180,000 g/mol, determined by osmometry) were calculated by simple $^1$H NMR analysis in the following manner.

Prior to $^1$H NMR analysis, a sample of the polymer to be analyzed was treated in three successive cycles, of dissolution in toluene followed by coagulation in methanol. The sample treated in this way was then dried at room temperature in a desiccator under a high vacuum produced by means of a vane pump.

For the $^1$H NMR analysis, a sample of the treated and dried polymer was solubilized in carbon disulfide. The characteristic signals due to the presence of CONH—C$_6$H$_5$ provide quantitative access to the proportion of amide groups in the functionalized polymer.

The results obtained are shown in Table II below, which refers to said starting styrene/butadiene copolymer ("starting SBR"), to a copolymer which has been hydroaluminated in a given molar ratio "DiBAH/kg polymer" but which has not been functionalized ("SBR hydroal"), and to six copolymers which have been hydroaluminated in different proportions and also functionalized ("SBR fct 1, . . . , SBR fct 6").

It should be noted that the functionalized polymers "SBR fct 5 and SBR fct 6" were each obtained from the hydroaluminated polymer "SBR hydroal".

TABLE II

| | Hydro-alumination: mol DiBAH/ kg SBR | Mooney viscocity ML (1 + 4) | Inherent viscocity (dl/g) | Mn (SEC) g/mol | Ip (SEC) | Tg (C) | Proportion of carboxyl or amide groups in meq/kg No. of units/chain | | |
|---|---|---|---|---|---|---|---|---|---|
| | | | | | | | acidimetry COOH | ester + NMR COOH | NMR amide |
| Starting SBR | | 30 | 1.43 | 138,000 | 1.09 | −40 | | | |
| SBR hydroal | 0.5 | 45 | 1.50 | 133,000 | 1.13 | −36 | | | |
| SBR fct 1 | 0.05 | 32 | 1.51 | 132,000 | 1.11 | −40 | 4 meq 1 unit | 5 meq 1 unit | |
| SBR fct 2 | 0.1 | 34 | 1.48 | 139,000 | 1.11 | −39 | 22 meq 4 units | 21 meq 4 units | |
| SBR fct 3 | 0.2 | 38 | 1.42 | 140,000 | 1.11 | −38 | 44 meq 8 units | 40 meq 7 units | |
| SBR fct 4 | 0.4 | 50 | 1.32 | 137,000 | 1.14 | −36 | 90 meq 16 units | 85 meq 15 units | |
| SBR fct 5 | 0.5 | 55 | 1.33 | 140,000 | 1.14 | −35 | 105 meq 19 units | 101 meq 18 units | |
| SBR fct 6 | 0.5 | 47 | 1.51 | 136,000 | 1.15 | −35 | | | 77 meq 14 units |

In view of these various Examples of implementation of the process according to the invention, it should be noted that the functionalized polymers obtained have a macrostructure which is practically identical to that of the corresponding starting polymers, as shown by the molecular weight distribution results (polydispersity indices Ip characterizing the corresponding polymers).

It should also be pointed out that the functionalized elastomers obtained in the above Examples of processes according to the invention are particularly intended for use in tires.

What is claimed is:

1. Process for the preparation of functionalized polymers comprising at least one double bond and having functional groups containing a carbonyl radical along their chain, comprising
    (a) subjecting a starting polymer comprising at least one double bond, in an inert hydrocarbon solvent, to a hydroalumination or carboalumination reaction along its chain by adding an agent derived from aluminum to the starting polymer,
    (b) adding to the product obtained in (a) at least one electrophilic agent that reacts with the agent derived from aluminum, and
    (c) stopping the functionalization reaction in (b) and recovering the functionalized polymer.

2. Process according to claim 1, wherein the agent derived from aluminum is an alkyl aluminum compound or an aluminate.

3. Process according to claim 2, wherein the agent derived from aluminum is diisobutylaluminum hydride.

4. Process according to claim 1, wherein between 0.05 mole and 5 moles of the agent derived from aluminum is added per 1000 g of the starting polymer.

5. Process according to claim 4, wherein between 0.05 mole and 0.5 mole of the agent derived from aluminum is added per 1000 g of the starting polymer.

6. Process according to claim 1, wherein the electrophilic agent contains a heteroatom.

7. Process according to claim 6, wherein the heteroatom is nitrogen and/or oxygen.

8. Process according to claim 6, wherein the electrophilic agent is carbon dioxide which results in a functionalized polymer having carboxylic acid groups along the chain.

9. Process according to claim 6, wherein the electrophilic agent is an isocyanate which results in a polymer having amide groups along the chain.

10. Process according to claim 9, wherein the isocyanate is phenyl isocyanate.

11. Process according to any one of claims 8 to 10, wherein the molar ratio of electrophilic agent to the agent derived from aluminum is equal to or greater than 3.

12. Process according to claim 9 or 10, wherein the molar ratio of isocyanate to the agent derived from aluminum is approximately equal to 4.

13. Process according to claim 1, wherein in (c) the functionalization reaction is stopped by adding a metal complexing agent.

14. Process according to claim 13, wherein the metal complexing agent lowers the viscosity of the reaction medium.

15. Process according to claim 13, wherein the metal complexing agent is a metal chelate capable of releasing at least one proton in the complexation reaction.

16. Process according to claim 15, wherein the metal chelate is acetylacetone.

17. Process according to any one of claims 13 to 16, wherein the molar ratio of the metal complexing agent to the derived from aluminum is equal to or greater than 3.

18. Process according to claim 17, further comprising adding a strong protonic acid, to the reaction medium to stop the functionalization reaction.

19. Process according to claim 18, wherein the strong protonic acid is hydrochloric acid.

20. Process according to claim 18, wherein the molar ratio of the strong protonic acid to the agent derived from aluminum is equal to or greater than 3.

21. Process according to claim 19, wherein the molar ratio of hydrochloric acid to the agent derived from aluminum is equal to or greater than 3.

* * * * *